May 19, 1964 N. R. ALENIUS 3,133,850
CONTINUOUS MAKING OF PLYWOOD
Filed Nov. 17, 1960 12 Sheets-Sheet 1
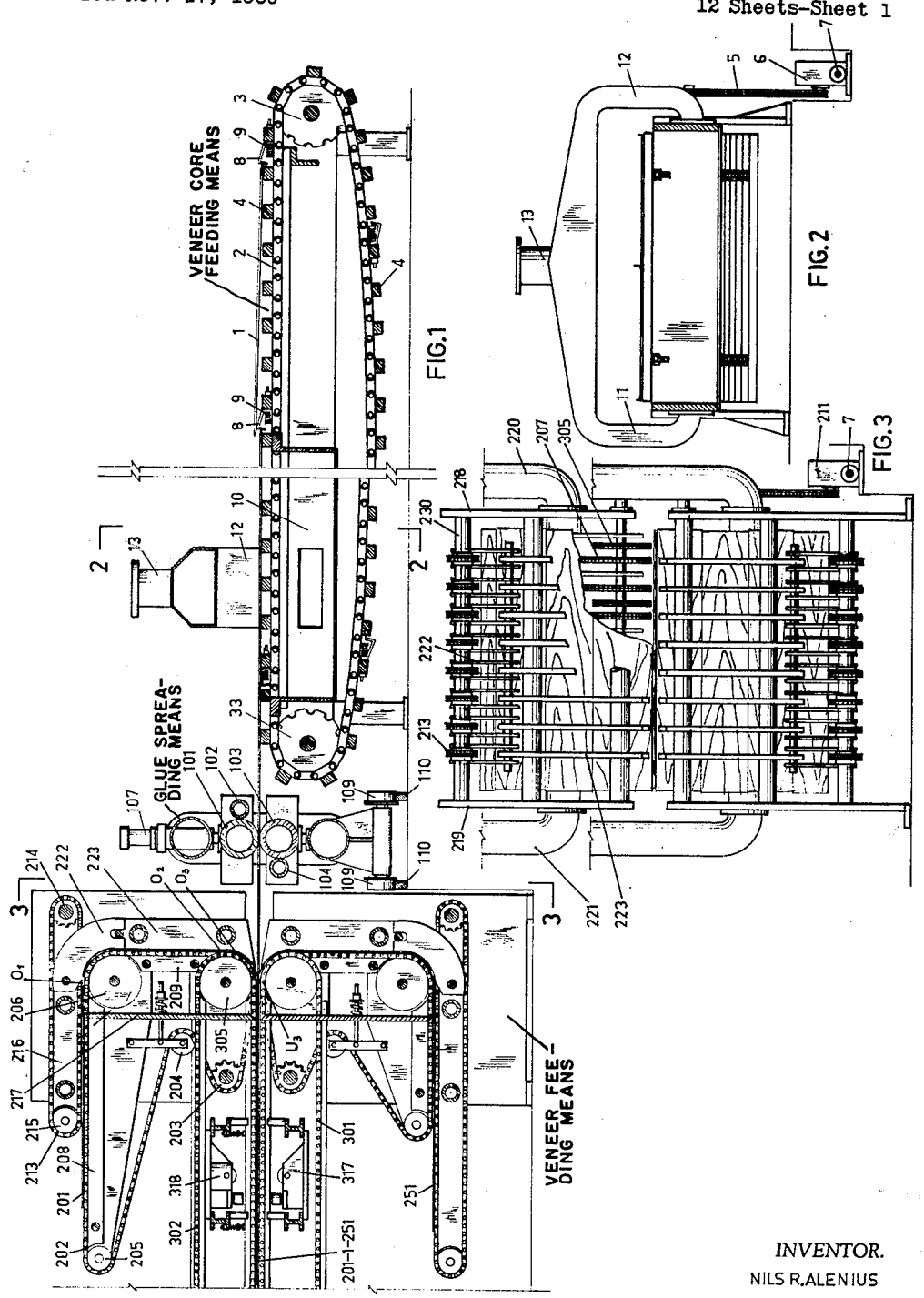
INVENTOR.
NILS R. ALENIUS
BY
ATTORNEY

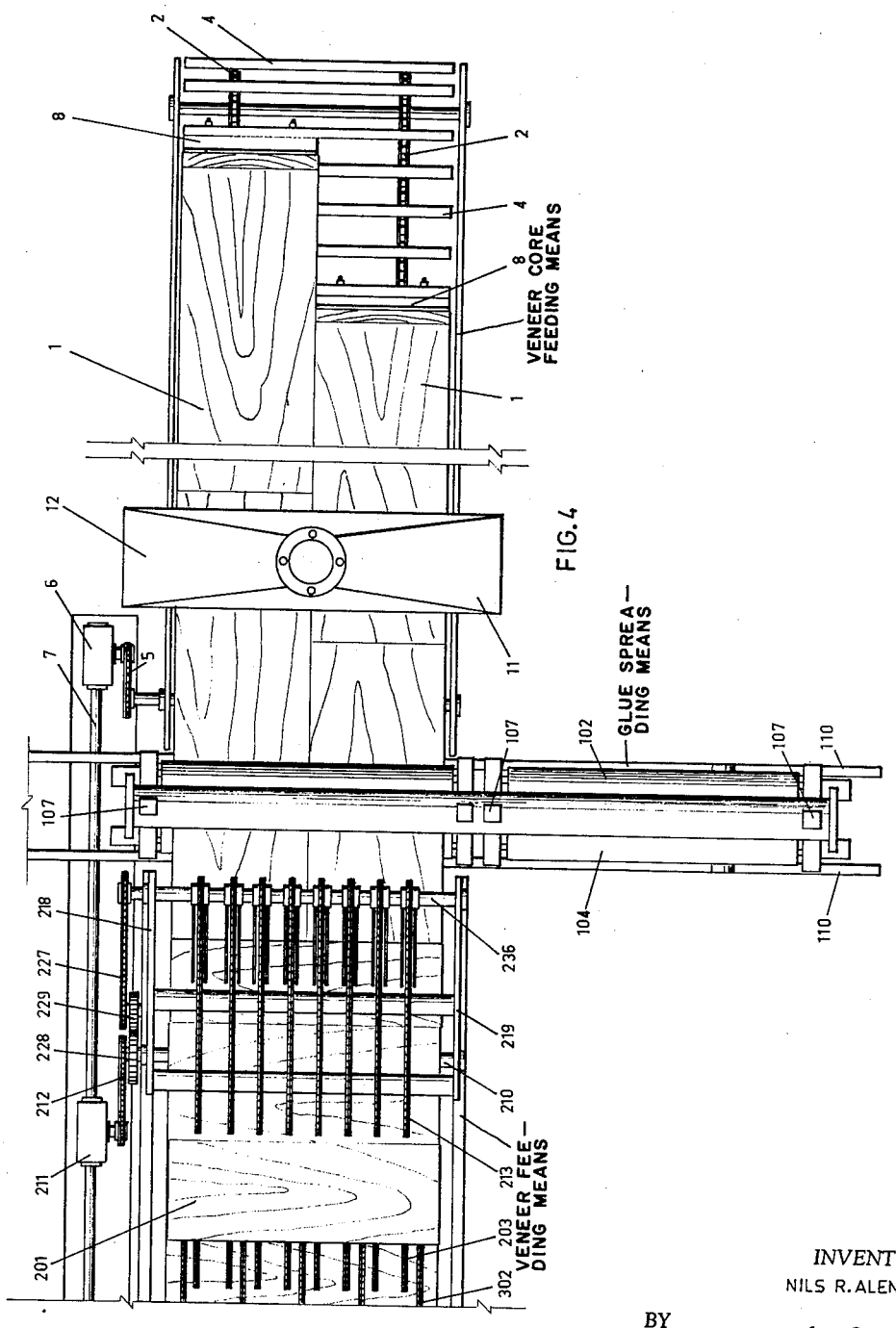

May 19, 1964
N. R. ALENIUS
3,133,850
CONTINUOUS MAKING OF PLYWOOD
Filed Nov. 17, 1960
12 Sheets-Sheet 3
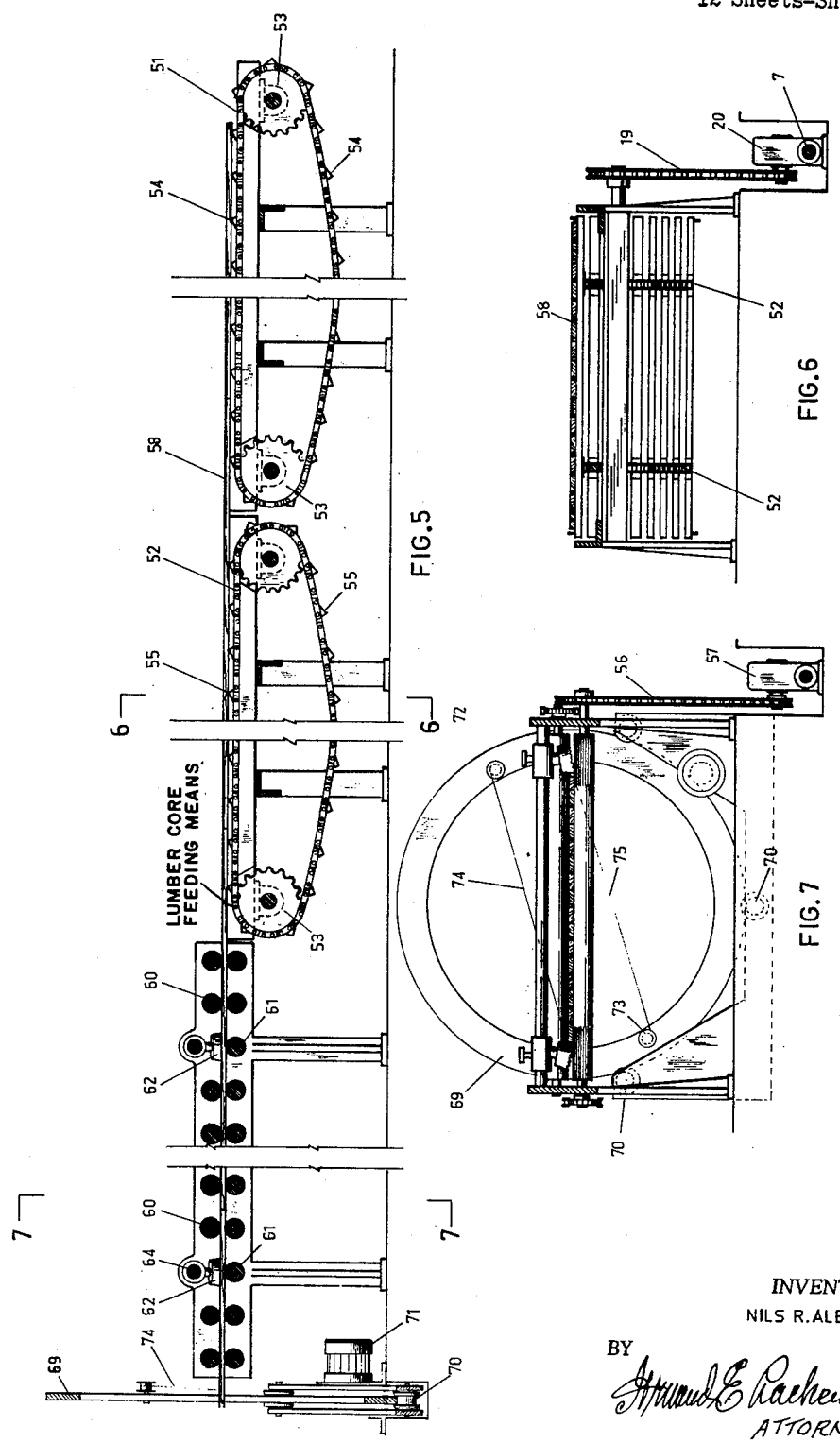
INVENTOR.
NILS R. ALENIUS
BY
ATTORNEY

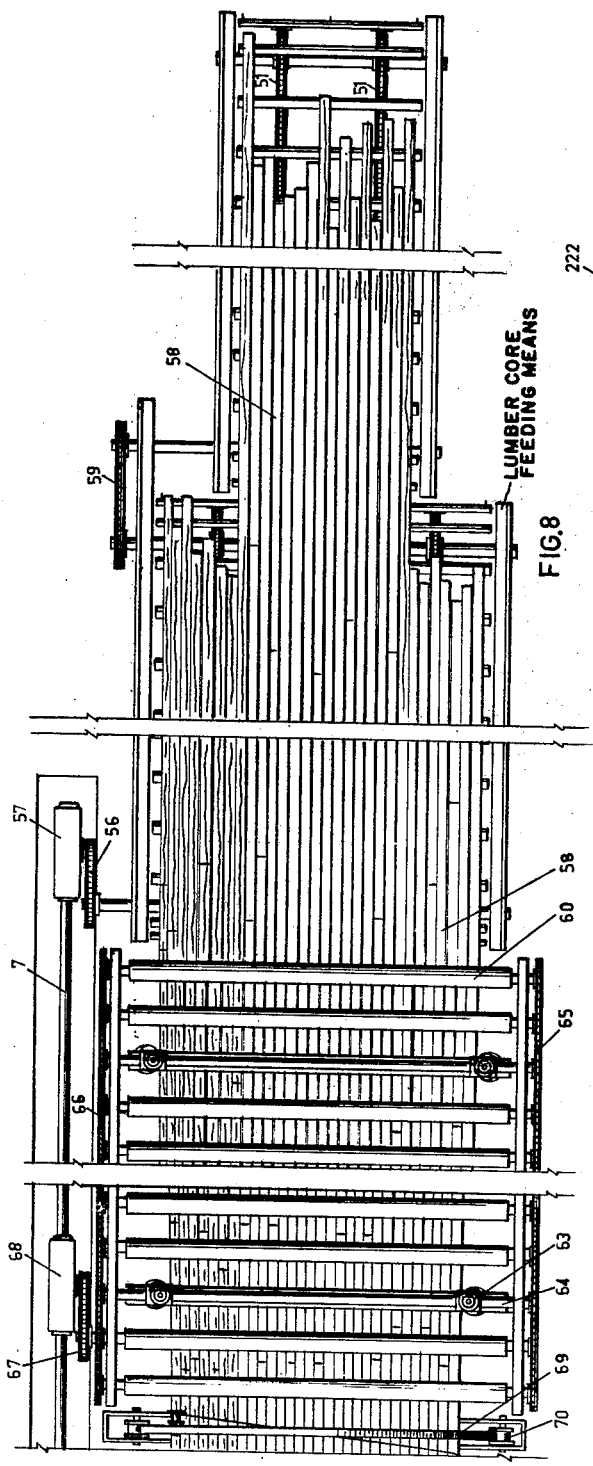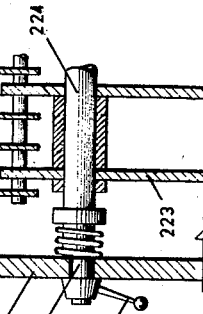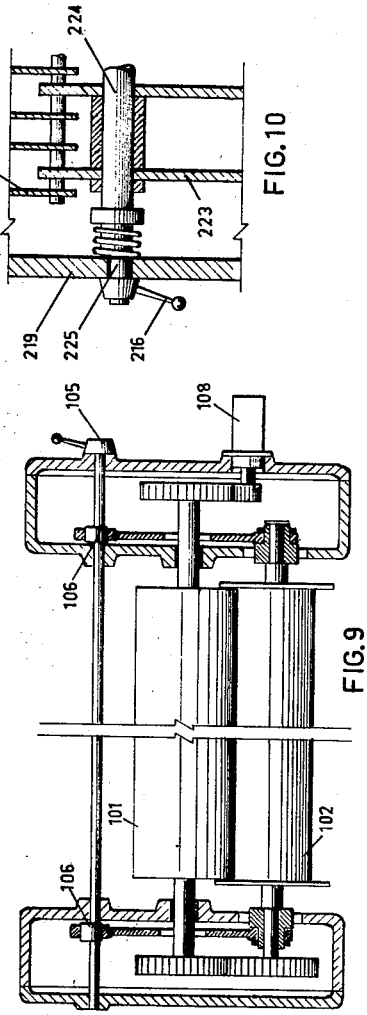

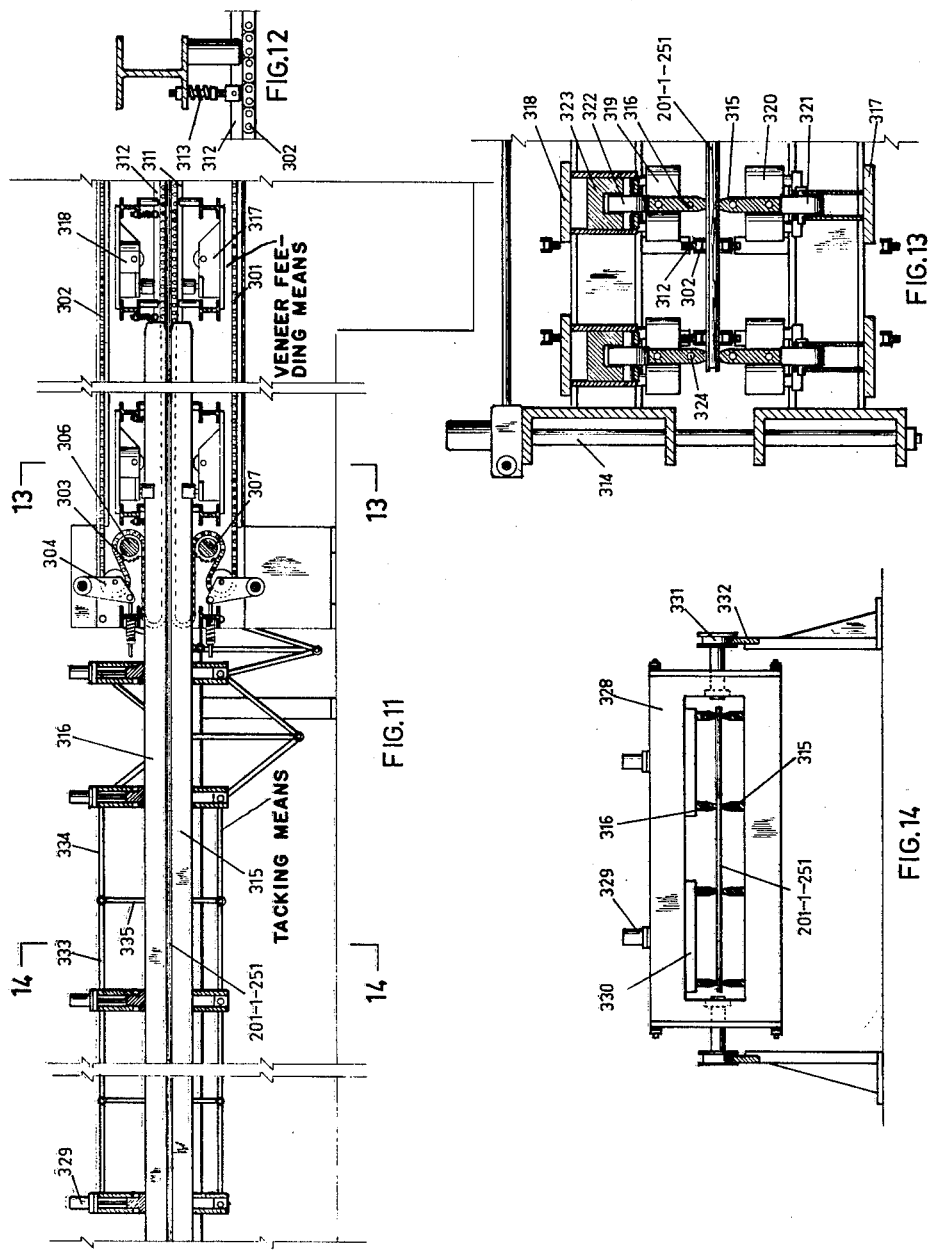

May 19, 1964 N. R. ALENIUS 3,133,850
CONTINUOUS MAKING OF PLYWOOD
Filed Nov. 17, 1960 12 Sheets-Sheet 6
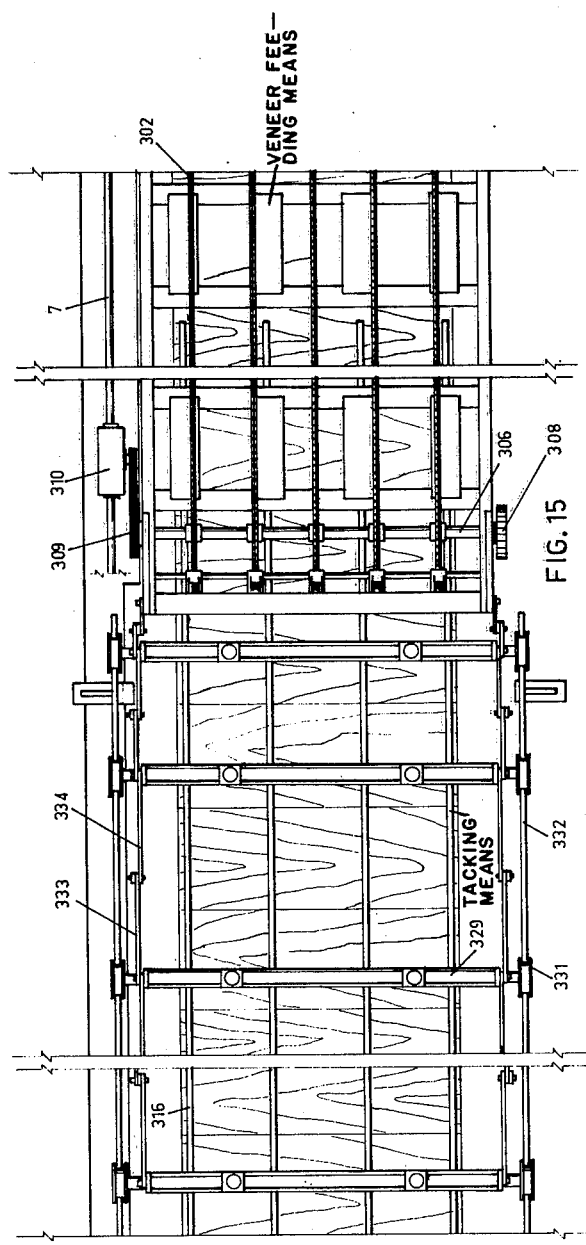
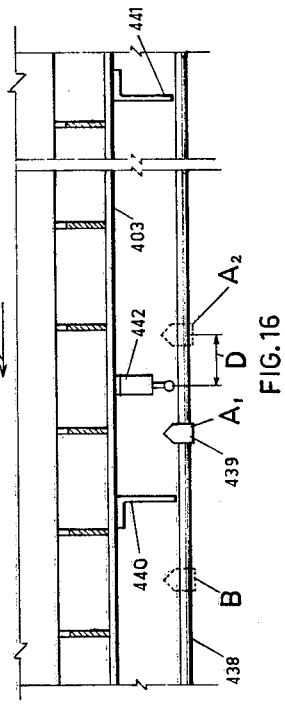
INVENTOR.
NILS R. ALENIUS
BY
ATTORNEY

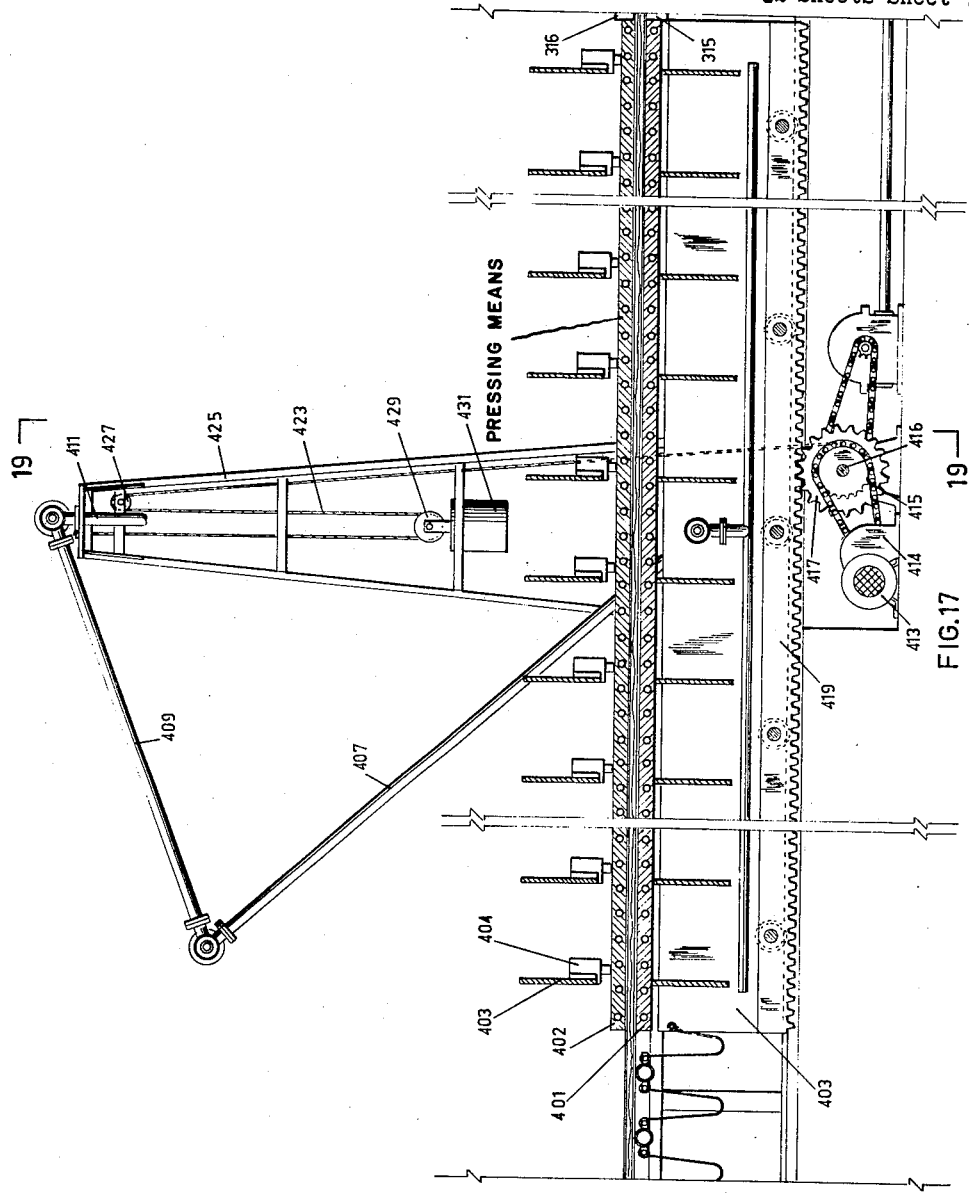

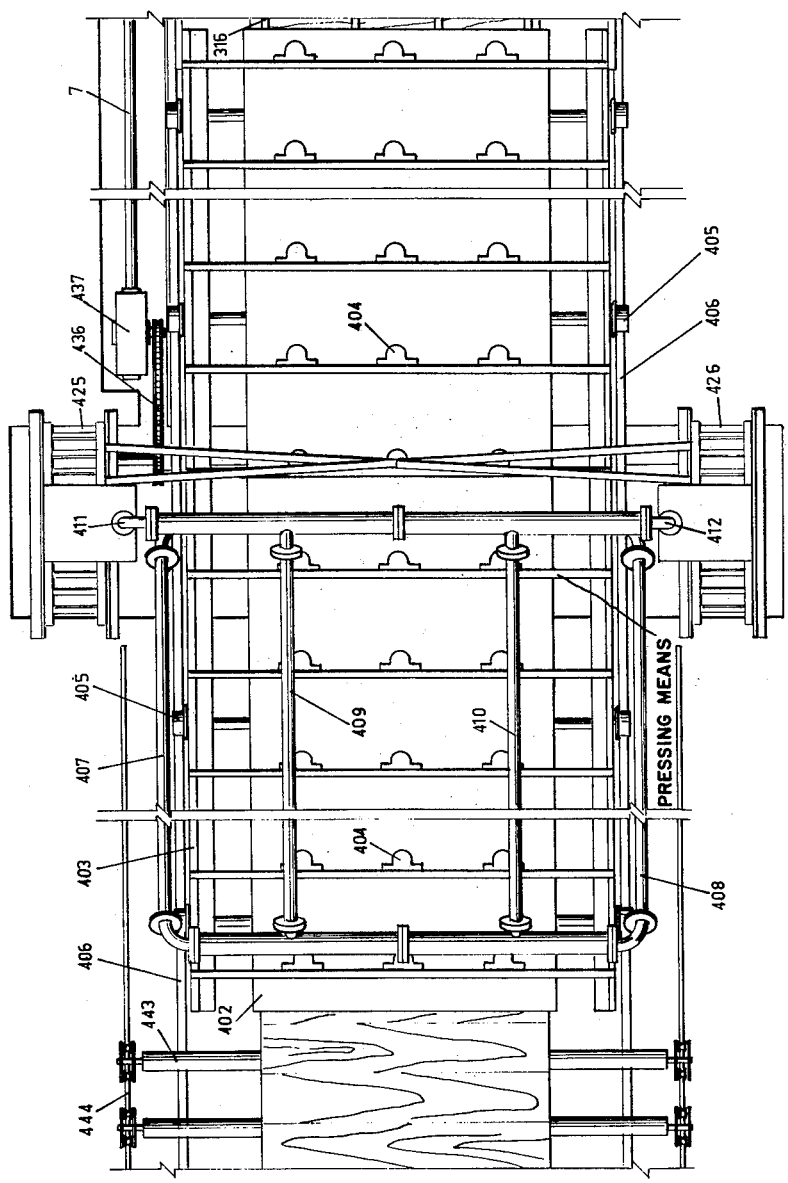

May 19, 1964 N. R. ALENIUS 3,133,850
CONTINUOUS MAKING OF PLYWOOD
Filed Nov. 17, 1960 12 Sheets-Sheet 9
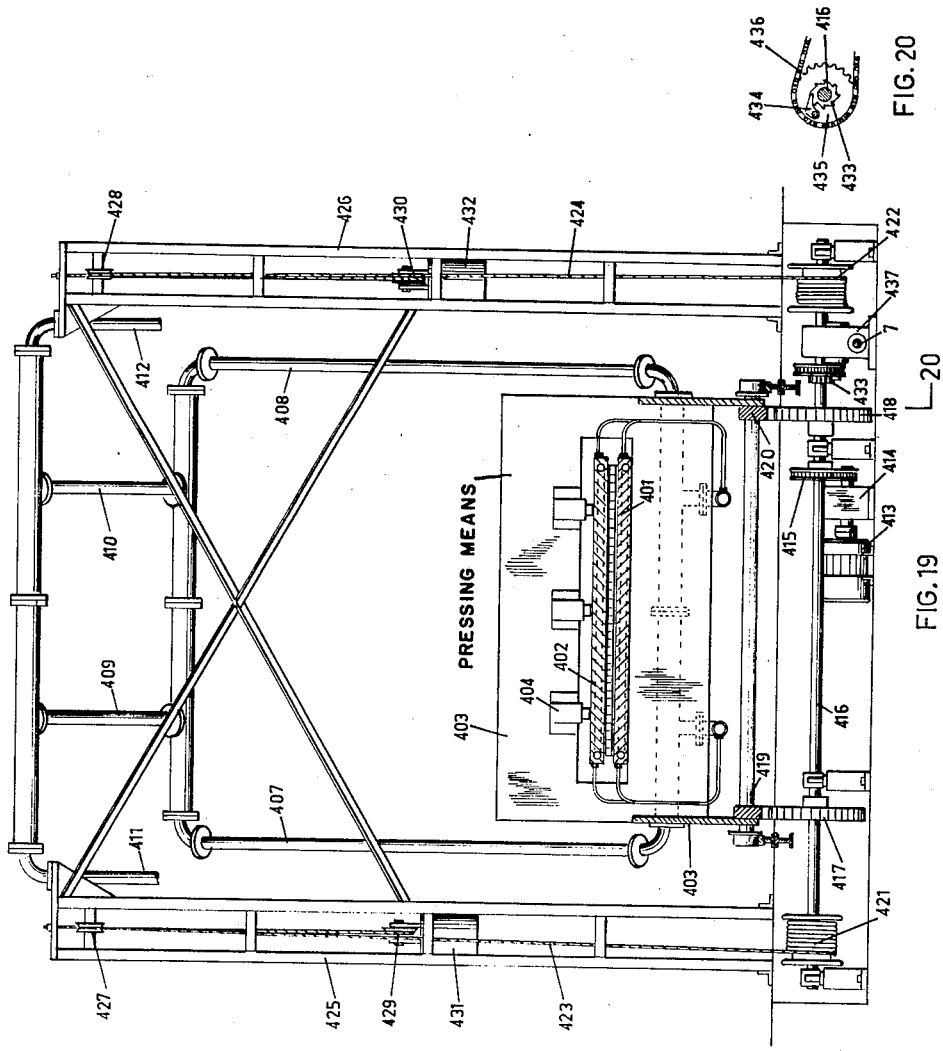
INVENTOR.
NILS R. ALENIUS
BY
ATTORNEY May 19, 1964   N. R. ALENIUS   3,133,850
CONTINUOUS MAKING OF PLYWOOD
Filed Nov. 17, 1960   12 Sheets-Sheet 10
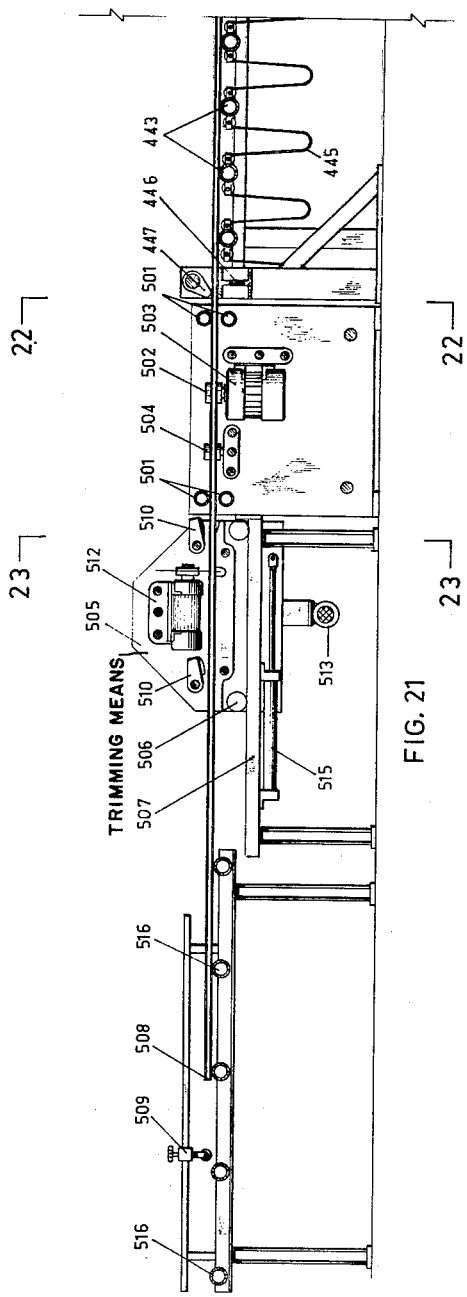
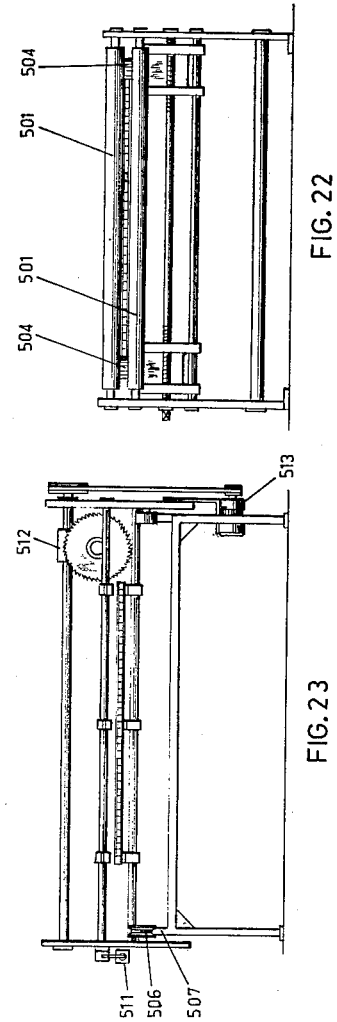
INVENTOR.
NILS R. ALENIUS
BY
*Armand E. Lachenbach*
ATTORNEY

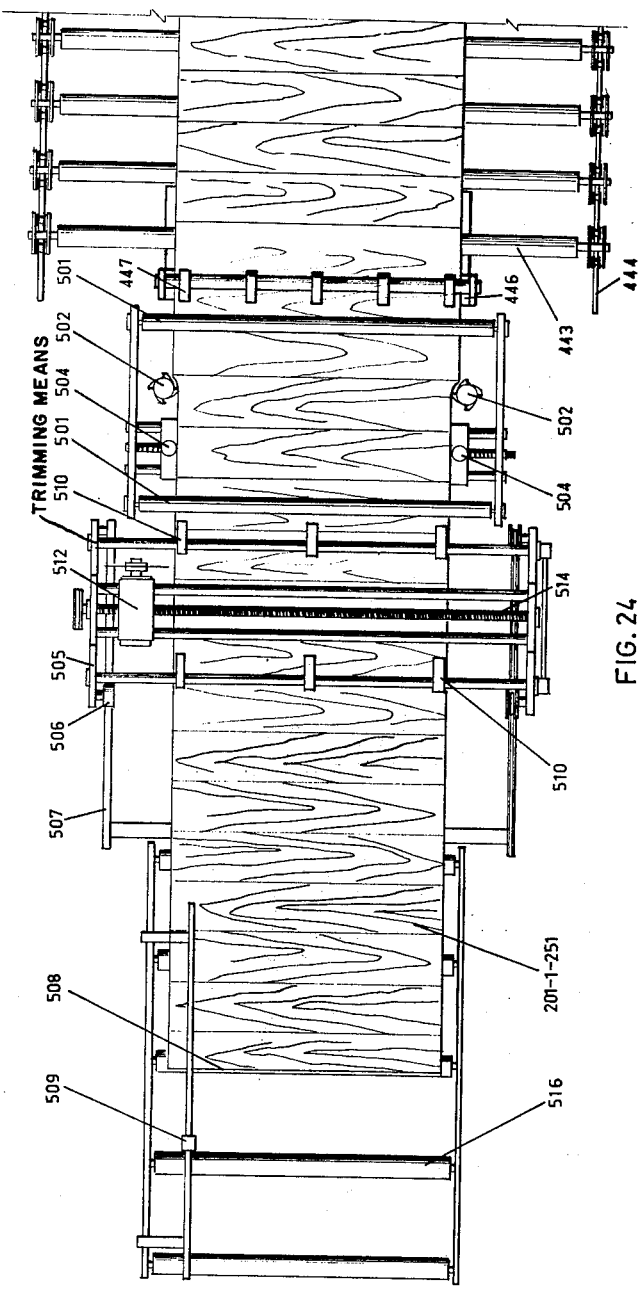

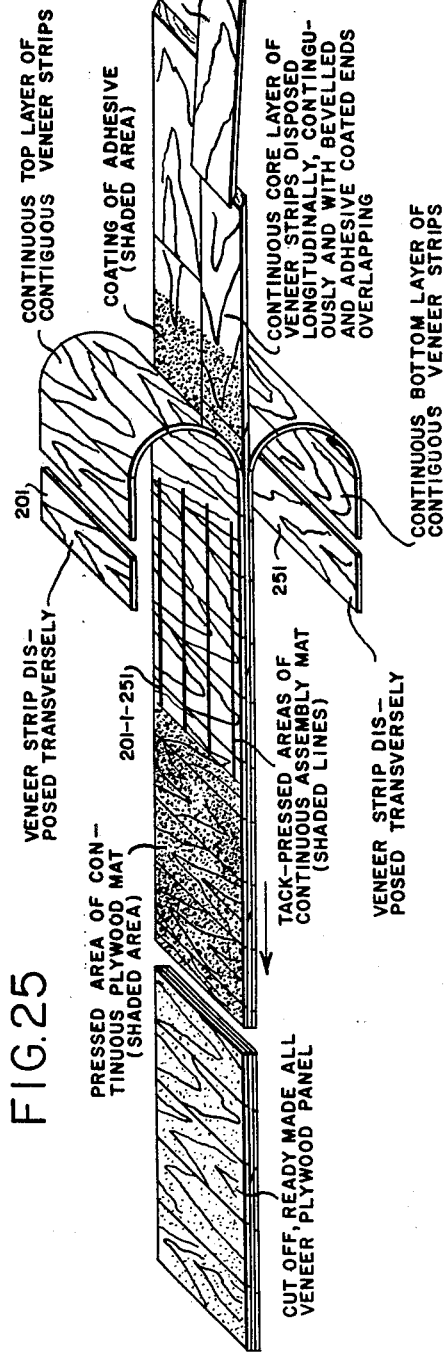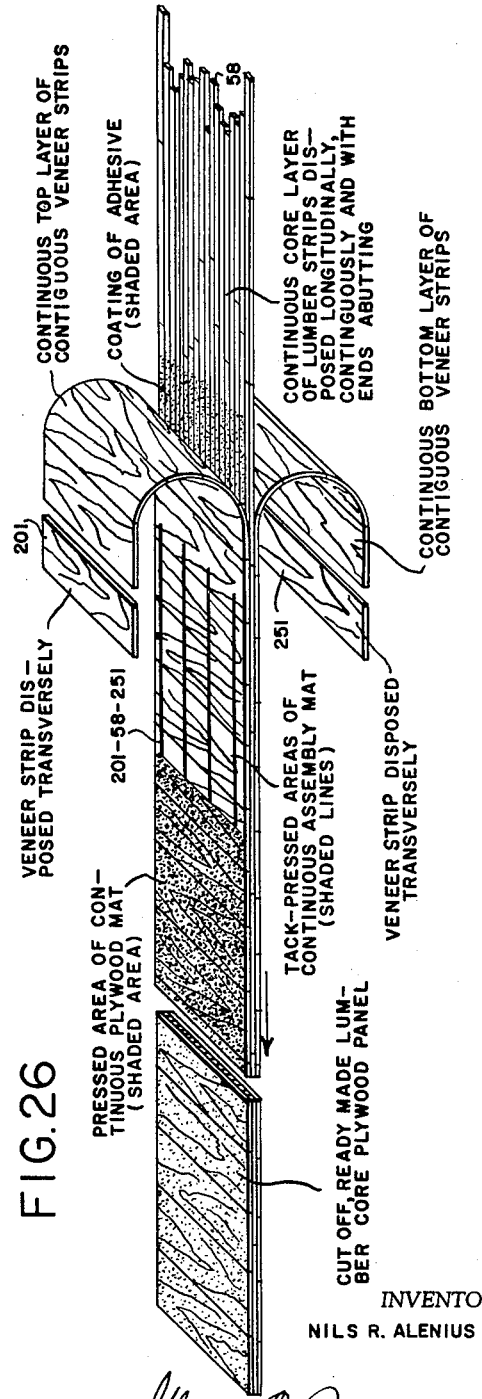

United States Patent Office 3,133,850
Patented May 19, 1964

3,133,850
CONTINUOUS MAKING OF PLYWOOD
Nils Robert Alenius, Jungfrugatan 60, Stockholm, Sweden
Filed Nov. 17, 1960, Ser. No. 70,061
8 Claims. (Cl. 156—558)

This invention relates to a new and improved method for the making of plywood and an apparatus to this end, whereby the plywood is produced in a continuous process, starting from the assembly of the components designed to form the plywood, and ending with the ready-made product emerging from the process in the form of a continuous mat, from which may be cut panels of the sizes desired.

The instant application is a continuation-in-part of application Serial Number 613,226, filed on October 1, 1956, and now abandoned.

The word "plywood" in this connection means in the first place what is commonly understood by the word: a laminated multi-ply panel of superimposed layers of wood glued together, with the grain of the wood in a layer generally running at right angles to that in the adjacent layers. For their part, the layers seldom consist of a single piece of wood of the size of the panel, but are composed of a number of components, such as veneer or lumber strips or the like, dependent on the type of the plywood. In prevailing practice, the components of the individual layers are prior to the assembling of the plywood bonded edgewise between themselves, as otherwise the components could be displaced from their proper position during the process of manufacture. However, this edge bonding of the components involves a number of expensive and complicated operations, and today means a substantial economic burden on the plywood industry.

For many years it has been an aim of plywood manufacturers to produce their plywood continuously in the form of a mat instead of discontinuously sheet by sheet, as is now the case. The trade has long recognized that the advantage by way of labour and in machine efficiency, uniform good quality of product, economy of production and free choice of size are all in favour of the continuous process. However, notwithstanding many attempts to solve the problems entailed, including the construction of expensive machines, no satisfactory practical solution has been found; the discontinuous method is still universal, and the dimensions of the product are limited to the size of the multi-opening press employed.

One object of the invention is to provide a method by which the plywood can be made continuously in a practical way, and produced in the form of an endless mat from which any desired length of panel may be cut at the end of the production line.

Another object of the present invention is that of providing a method of making plywood whereby the necessity of edge-bonding the components of the individual layers between themselves prior to their assembly can be eliminated, and the components, directly as such, can be used for the building up of the plywood.

A further object is the provision of a method whereby a plywood assembly built up of components not edge-bonded between themselves can, irrespective of the size of the components, be handled during the manufacturing process and transferred into the glue-setting press with no displacement of the components from their proper position in the assembly.

Still another object is that of providing an apparatus for the implementation of the method contemplated by the invention.

Other objects and advantages will appear in the following description, and the novel features of the method and the apparatus will be particularly pointed out in the claims appended.

Theoretically, some of the objects cited might be achieved by the use of a travelling press with press plates in the form of a pair of cooperating endless caterpillar belts, as contemplated in the U.S. Patents No. 2,490,819, No. 1,870,041 and No. 2,071,999. Another theoretical solution would be the use of pressing bars which move longitudinally to and fro according to U.S. Patents No. 2,289,022 and No. 2,340,607. By feeding the assembled components through presses of these types, the goods could be handled and the adhesive made to set in a way which would, in contrast to the prevailing batch pressing method, make continuous production possible, and also reduce the risk of the individual components of the assembly becoming displaced. Nevertheless, for the manufacture of ordinary plywood, the pressing system envisaged in the aforesaid patents implies no practical solution, and, as far as is known, has never been used for this purpose. Even if one disregards certain undesirable effects on the goods passing through presses of this type, the presses themselves constitute a sufficiently serious obstacle to make them of but little value in industrial use. Owing to the high specific pressure needed for the setting of the adhesive, the moving parts of the presses and their bearings must be of very heavy construction, and as also heat has to be conducted to the moving elements and must act upon the materials for some time to that extent the units will be so complicated and expensive that they cannot be used to advantage by the plywood manufacturer.

The process according to the present invention eliminates the disadvantages mentioned above. It makes possible the continuous manufacture of plywood in a simple and inexpensive way without the aid of a travelling press of the aforesaid type. In this invention, the setting of the glue is carried out in a special two stage operation, to which end a one-opening press with plates of ordinary rigid type can be used. This press is made mobile on a track, and follows synchronously the moving materials during the operation of pressing; after the setting is done, it returns rapidly to the starting point and repeats the pressing cycle. This act of pressing is preceded by another pressing operation whereby the glue of the assembly is set on predetermined limited areas, and by this operation the assembly is "tacked" to an extent which enables it to be transferred into the first mentioned press with no risk of its components being displaced from their position. An apparatus for carrying out the tacking of the assembly is described in the inventor's co-pending application, Serial No. 789,308. This apparatus comprises a number of pressing elements consisting of superimposed endless chains, adapted to provide pressure and heat to the goods along narrow, line-formed areas. In the present invention, which represents in this respect another embodiment of the aforesaid invention, this operation is carried out by the aid of pressing bars, which, like the one-opening press, move back and forth in the longitudinal direction of the travelling plywood assembly.

In addition, the present invention is characterized by a number of automatic and continuous operations for the making of plywood in the form of an endless mat. The line of operations starts with the plywood components being assembled by a special means of feeding to form continuous layers of wood, which, after adhesive has been applied between them, are continuously superimposed to form an endless multi-ply assembly. The assembly so obtained is held together by special means of conveyance, and during the continuous movement forward submitted to the aforementioned two-stage bonding operation whereby in the first stage the adhesive in the assembly, while the assembly is still held together by the means of conveyance, is subjected to a tacking operation for the preliminary fixing of the components to each other, and then in the second stage to a continuous pressing operation carried out in a mobile press. The plywood mat so produced on emergence from the press is then submitted to an edge trimming operation, following which it is automatically cut into panels of the lengths desired.

The present invention also makes reference to a new and improved apparatus adapted to carry out the aforementioned method. It comprises a series of units which together, one after the other, in an automatic and continuous way, carry out the different operations which constitute the method.

For the accomplishment of the foregoing, the description will set forth an embodiment of the invention. However, this is indicative of but one of the various ways in which the principle of the invention may be employed. Thus, for instance, the description is concerned only with the making of three-ply plywood, the type mostly manufactured, but this does not imply that the method could not be used for the manufacture of plywood with a greater number of plies were the apparatus correspondingly designed to meet this extended requirement.

In order to make the following description explicit, the description of the apparatus for the manufacturing process is split into a number of sections, each of which deals with a certain stage of operation of the process. Thus, in the following the assembly and the initial feeding of the core layer will be referred to as the "core feeding" section. This section will, however, illustrate two different embodiments: one refers to the formation of the core for all-veneer plywood, termed the "veneer core feeding" section, and the other refers to the forming of a lumber strip layer for lumber core plywood, termed the "lumber core feeding" section. The part of the apparatus wherein the glue is spread will be referred to as the "glue spreading" section. The section dealt with as the "veneer feeding" section comprises the assembling and the initial feeding of the veneer components intended to form the top and bottom layers of the plywood. The tacking of the assembly composed of the superimposed layers will in the following be referred to as the "tacking" section, while the continuous pressing of the plywood will be entitled the "pressing" section. Finally, the edge trimming of the plywood mat and the cutting of panels therefrom will be referred to as the "trimming" section.

In the accompanying drawings, which form a part of the specification, and wherein reference symbols refer to similar parts wherever they occur, FIG. 1 is a longitudinal sectional view of the devices representing the "veneer core feeding" section, the "glue spreading" section, the "veneer feeding" section, and part of the "tacking" section, FIG. 2 is a transverse sectional view taken along the plane 2—2 of FIG. 1, FIG. 3 is a transverse partly sectional view taken along the plane 3—3 of FIG. 1, FIG. 4 is a top plan view of the devices illustrated in the sectional view of FIG. 1, FIG. 5 is a longitudinal sectional view of the device representing the "lumber core feeding" section, FIG. 6 is a transverse sectional view taken along the plane 6—6 of FIG. 5, FIG. 7 is a transverse partly sectional view taken along the plane 7—7 of FIG. 5, FIG. 8 is a top view of the device illustrated in FIG. 5, FIG. 9 is an enlarged fragmental horizontal sectional view of a detail of the "glue spreading" section, FIG. 10 is a view of a detail of the "veneer feeding" device, FIG. 11 is a longitudinal sectional view of the remainder of the device representing the "tacking" section, FIG. 12 is a view of a detail of the "tacking" device, FIG. 13 is a fragmentary enlarged transverse sectional view taken along the plane 13—13 of FIG. 11, FIG. 14 is a transverse sectional view taken along the plane 14—14 of FIG. 11, FIG. 15 is a top plan view of the device illustrated in FIG. 11, FIG. 16 is a schematic view showing a detail of the press control, FIG. 17 is a longitudinal sectional view of the device representing the "pressing" section, FIG. 18 is a top plan view of the device illustrated in FIG. 17, FIG. 19 is a transverse view, partly in section, taken along the plane 19—19 of FIG. 17, FIG. 20 is a fragmentary longitudinal sectional view taken along the plane 20—20 of FIG. 19, FIG. 21 is a longitudinal view showing the remainder of the device shown in FIG. 17, and the devices representing the "trimming" section, FIG. 22 is a transverse partly sectional view taken along the plane 22—22 of FIG. 21, FIG. 23 is a transverse partly sectional view taken along the plane 23—23 of FIG. 21, FIG. 24 is a top plan view of the devices illustrated in FIG. 21, FIG. 25 is a diagrammatic illustration of the continuous making of all veneer plywood, FIG. 26 is a diagrammatic illustration of the continuous making of lumber core plywood.

The "Veneer Core Feeding" Section

The building up of the continuous veneer core for all-veneer plywood is effected by manual positioning of the veneer strips or sheets constituting the core on a conveyor arrangement, shown to the right in FIGS. 1 and 4. Veneer components 1 are assembled contiguously side by side and end to end on a travelling conveyor comprising endless chains 2 running over sprocket wheels 3 and having transverse carrying bars 4 supporting the veneers. By means of a chain drive 5, a transmission agent 6 connected to the main shaft 7 of the apparatus, the conveyor is brought to feed in a right to left direction in reference to the figures at a rate equal to the speed of the travel of plywood.

In order to obtain a continuous core with equal strength over its whole length, the ends of the veneer strips are previously bevelled, and the bevels coated with adhesive, enabling the veneers to become scarf-jointed in the final pressing operation. So that the bevelled ends are placed in a correct overlapping position, the conveyor comprises pivoted stoppers 8 located at intervals corresponding to the length of the strips. By means of springs 9, the stoppers 8 are held in a somewhat raised position, as shown in FIG. 1. The veneer strips 1 are placed on the conveyor with their rear ends abutting on the stoppers, whereby the foregoing stoppers hold the fore-end of the veneer strip raised in an overlapping position over the rear end of the foregoing strips. As the veneers are carried forward, the raised fore-ends are pressed down against the foregoing rear ends, and the veneer strips kept lying tightly on conveyor bars 4 with their bevelled ends correctly overlapping each other.

Pressing down the veneer strips and keeping them to the bars is in accordance with the embodiment brought about by a suction device combined with the chain conveyor, as shown in FIGS. 1, 2 and 4. The suction device comprises a suction box 10, placed beneath the upper reach of the conveyor; this suction box is connected to an exhauster by means of conduits 11, 12 and 13. The negative pressure or vacuum of suction box 10 acts on the veneer strips 1 travelling over the box and, by pulling the veneers down, fixes them to carrying bars 4. Having passed suction box 10, the conveyor bars diverge from the assembled veneer strips, which with their rear ends still fixed to the bars are moved forward and brought into the next, i.e. the glue spreading section.

The "Lumber Core Feeding" Section

The building up of the continuous lumber core for lumber core plywood is carried out on a conveyor device illustrated in FIGS. 5, 6 and 8. At the feed end, to the right in the figures, the assembling conveyor comprises endless conveyor chains 51 and 52 running over sprocket wheels 53, and themselves connected with transversal carrying bars 54 and 55. The conveyor is driven in the direction from the right to the left with reference to the figures by main shaft 7 of the apparatus with the aid of a chain drive 56 and a transmission agent 57. Lumber strips 58 which are to constitute the core can be of random lengths, and are placed on conveyor bars 54 and 55 in juxtaposition, and end to end, with the strips lengthwise in the travelling direction of the conveyor preferably with the abutting end joints of adjacent strips in different transverse sections. In order to facilitate the placing of the strips on the conveyor its width increases stepwise. This is attained by arranging conveyors of different widths one after the other. As an example, FIG. 8 shows an arrangement comprising two steps. In the figures the movement of the conveyor to the left, which is driven by the main shaft, is transmitted to the other one by a chain drive 59.

When the lumber strips have been assembled in the manner described above, they are conveyed into a side pressing device consisting of a series of upper and lower rotating rolls 60 and 61, between which the core mat of strips is kept flat. Furthermore, there are vertical rolls 62 at either side of the device with the object of exercising lateral pressure on the strips, and thereby tightening the mat to the extent desired. Rolls 62 are mounted on sleeves 63 transversely adjustable on rods 64, enabling the side-pressure to be applied convergently on the core mat during its forward travel. Rolls 62 are rotated by rolls 61, whose ends have gears in which engage rolls 62. Rolls 60 and 61 are driven between themselves by chain drives 65 and 66, and connected to main shaft 7 by means of chain drive 67, and power transmission 68.

In order to get the strip ends closely abutted on each other, the core feeding conveyor as well as the side pressing device described, may be run at a somewhat higher speed than that of the plywood itself travelling through the apparatus.

In FIGS. 5 and 8, on the left, and in FIG. 7, is shown a device which may optionally be used for additional fixing of the core mat if, for instance, the strips are exceptionally short or crooked. The device comprises an annular frame 69 carried by rolls 70 and rotated by a motor 71. On the frame are bobbins 72 and 73, from which cords 74 and 75 are wound round the core mat on its proceeding through the rotating frame. By winding the cords round the core, an extra safeguard is obtained to ensure that the strips do not get displaced during the further treatment of the core mat. However, by the use of strips of ordinary type and length, the winding operation is in general superfluous.

The "Glue Spreading" Section

The adhesive spreader device is illustrated in the centre of FIGS. 1 and 4, and in an enlarged sectional view in FIG. 9. It comprises an upper spreader roll 101 co-acting with a doctor roll 102 and a lower spreader roll 103 co-acting with a doctor roll 104. Spreader roll 101 is driven in the clockwise direction, and roll 103 in the opposite direction on either side of the travelling core. The adhesive is led from the opening defined by the spreader and doctor roll through the adjustable space between them, and passed on by the spreader roll to the core at their line of contact, whereby the core is accordingly coated with adhesive on both sides. The extent of the coating is regulated by turning handlever 105, which by means of eccentrics 106 adjusts the space between the spreader and doctor rolls. The pressure of the spreader rolls on the core mat is effected by pneumatic cylinders 107.

It is of essential importance that the rotation of the spreader rolls 101 and 103 corresponds exactly to the speed of the core, travelling at the rate determined by the number of revolutions of main shaft 7. The spreader rolls, however, cannot be driven from the same source of power; these are rubber-coated and elastic, and thus the radius of the rolls would vary and consequently the feeding rate of the rolls deviate from the progressing of the core. Each spreader roll is therefore driven by a separate power source of flexible efficiency, such as an air motor, which is also used in the present embodiment and indicated by reference 108 in FIG. 9. The air motor is adjusted to yield a torque which gives the spreader roll a revolving force great enough to keep the roll rotating, but not so as to exceed the friction at its line of contact with the core. By this arrangement, the spreading apparatus and the travelling core run absolutely synchronously irrespective of the speed of travel of the core.

The adhesive spreader is further constructed as a double device comprising two congruent spreader sets as shown in FIG. 4. The device is movable on wheels 109 along rails 110, shown in FIG. 1, running transversely to the working direction of the apparatus. By using a double spreader device the manufacturing process need not to be stopped during the period necessary for the cleaning of the spreader, as this can rapidly be replaced by the other one, which has in the meantime been cleaned outside the line of manufacture.

It is apparent that the glue spreading device, in the form described above, can be omitted if a film glue is used for the bonding of the plywood instead of liquid adhesive. In the latter case, there is no need for spreader rolls, as the film can simply be unwound from the film glue roll and automatically drawn in between the layers on their movement forward. It is also possible to use liquid glue in the same way as the film if the glue is first applied to a glue carrying web and the coated web is then, like the film, led in between the layers.

The "Veneer Feeding" Section for the Assembling of the Top and Bottom Layers From the adhesive spreader, the core is transferred to the veneer assembling device illustrated in the centre of FIGS. 1 and 4, and as a transverse partly sectional view in FIG. 3. In this device, the continuous top and bottom plies of the three-ply plywood are assembled and brought into juxtaposition on either side of the core. The device comprises two separate means of feeding, one intended for top veneer layer 201, and the other for bottom layer 251. As both means act in the same manner, the description is limited so as to comprise only the means of assembly for the top veneer layer. This layer is built up of veneer strips whose lengths correspond to the width of the plywood mat, and which are placed by hand on a feeding conveyor with the grains of the veneers transverse to it. The conveyor comprises a number of spaced endless conveyor chains 202 driven by sprocket wheels 203 and running over guiding wheels 204, 205, 206 and 207 and guiding rails 208 and 209. Sprocket wheels 203 mounted on shaft 210 are in their turn driven by main shaft 7 by means of a transmission agent 211 and chain drive 212. By means of chains 202 the veneer strips are fed to the right with reference to the figures, and conveyed into the space between chains 202 and the superimposed co-operating endless chains 213 driven by sprocket wheels 214 and guided by discs 215 and rails 216. As chains 202 and 213 are run at a higher speed than the speed of travel of the plywood through the apparatus, the individual veneer strips are at this stage driven edgewise together, thereby constituting a continuous mat of veneer. At point $O_1$, the moving veneer mat is bent over guiding wheels 206, and at point $O_2$ over guiding wheel 207 so as to join the core at point $O_3$. In order to safeguard the transfer of the veneer mat between points $O_1$ and $O_3$, and especially at point $O_3$, where the veneer joins the core, the veneer mat is firmly tightened against chains 202 by subjecting the space confined by wall 217 and the encircling veneer mat to negative pressure or vacuum, the air being evacuated from the space by means of air conduits 220 and 221. In addition to this, the veneer mat is guarded externally by special guide rails 222 and 223 shaped to match the path of the veneer. Guide rails 222 and 223, as well as chains 213, are made adjustable, whereby the veneer path can be adjusted to correspond to various thicknesses of the veneer. FIG. 10 shows a construction whereby this adjustment can be carried out. By means of an eccentric journal 225 and a handlever 226 transverse rod 224, which carries guide rails 223 is movable in relation to conveyor chains 202, thereby allowing the space between the chains and guiding rails through which the veneer is fed to be adjusted. At points $O_3$ and $U_3$, the continuous veneer mats for the top and the bottom layers respectively are taken over by the co-operating conveyor chains 301 and 302, which forward the thus assembled three-ply assembly mat 201-1-251 to the following, i.e. the "tacking" section.

The negative pressure or vacuum used for tightening the veneer mat against chains 202 offers a convenient means for regulating the lateral pressure exerted on the abutting edges of the veneer strips by varying the degree of the evacuation. If, for instance, the degree of vacuum is increased, the friction between chains 202 and the veneer strips will grow and, as the chains are moving faster than the veneers, the lateral pressure between the individual strips will also increase. This possibility of exact regulation of the lateral pressure, together with the fact that neither glue nor heat need be used beforehand for the splicing of the strips, means that very tight and nearly invisible joints are obtained between the strips, which constitutes an additional valuable feature of the process described.

*The "Tacking" Section for the Preliminary Bonding of the Plywood*

The device for the tacking of the components of the plywood assembly 201-1-251 is illustrated to the left in FIGS. 1 and 4 showing the feed-end and in FIGS. 11 and 15 showing the remainder of the device, of which sectional views are illustrated in FIGS. 13 and 14. The feed-end consists of a plurality of spaced and superimposed co-operating endless chains 301 and 302 running over sprocket wheels 303, 304 and discs 305. Driving shafts 306 and 307 are made to co-operate by means of gear wheels 308, and are, by means of a chain drive 309 and transmission agent 310, connected to main shaft 7 and run at a rate corresponding to the travel of the plywood. The upper reach of lower chains 301 is guided by rails 311, and the lower reach of upper chains 302 is guided by rails 312 loaded by springs 313, a detail of the last-mentioned arrangement being illustrated in FIG. 12. The continuous three-ply assembly 201-1-251 emerging from the "veneer feeding" and the "core feeding" sections is conveyed along in the space between superimposed chains 301 and 302, which is adjustable by screw columns 314 shown in FIG. 16. The assembled plywood components are firmly kept together and prevented from being displaced by the pressure exerted by springs 313 of upper chains 302. While held in this grip, the assembly mat is submitted to a tacking operation by which the adhesive is brought to set to an extent which permits the assembly to be handled, also after it has left the operation range of chains 301 and 302 at their exit end, without its components getting displaced. The tacking is carried out by means of pressure and heat, brought to act upon narrow elongated areas of the plywood assembly 201-1-251 by the aid of a number of pressing bars 315 and 316 operating in pairs and moving back and forth alongside chains 301 and 302.

Pressing bars 315 and 316 are within the working range of co-operating chains 301 and 302 guided by guide blocks 317 and 318 placed along the stroke path of the bars. These blocks comprise rolls 319 and 320 for the lateral guiding of the bars and rolls 321 and 322 for their vertical guiding. Rolls 321 for lower bars 315 have a fixed position whereas rolls 322 for upper bars 316 are connected to vertically movable pneumatic pistons 323, capable of exerting the necessary adhesive setting pressure on the bars. The bars themselves are furnished with channels 324, through which a heated agent is passed in order to heat the bars to desired temperature. The bars are made glossy in order to diminish radiation of the heat.

In the invention the tacking of the assembly is carried out as follows: When mobile bars 315 and 316 are in their most extended position to the right in reference to the figures, i.e. with the right-hand ends close to the "veneer feeding" section, they start moving to the left. Once the speed of the travelling assembly has been reached the heated bars are submitted to pressure from upper rolls 322, the bars thereby starting to set the adhesive of the plywood assembly on areas corresponding to the contacting surfaces of the bars. As the bars, in their forward movement, leave the exit end of the operation range of chains 301 and 302, and thus also the co-operating pressing rolls 321 and 322, the pressing of the bars taken over by a number of pressing means shown to the left in FIGS. 11 and 15, and as a transverse view in FIG. 14. These means comprise a frame 328 encircling the plywood assembly 201-1-251 held by the pressing bars 315 and 316 and on which frame are mounted hydraulic jacks 329, which, through the intermediation of cross pieces 330 can exert pressure on the bars inside the frame. Frames 328 are themselves carried by wheels 331, which run on rails 332 and are kept upright and correctly spaced by means of articulated links 333, 334 and 335, allowing the frames alternately to be pushed together and pulled apart. When on the pressing stroke the bars have advanced a certain distance out of the operation range of chains 301 and 302, the frame to the extreme left in the row of frames 328, at this stage pushed together, is actuated to exercise pressure on the bars inside it, whereby the frame starts moving with the advancing assembly and continues the setting of the glue. When the first frame has reached the distance from the second frame determined by the linkage 333, 334 and 335, the second one is put into operation in the same way as the first, and then the next ones follow until the bars have reached their most extreme position to the left. At this stage of operation, the right-hand ends of the bars are still within the operation range of chains 301 and 302, so that no part of the assembly 201-1-251 is not guided. At this time, the adhesive of the tacking lines is also set. The pressure exerted by jacks 329 and by pneumatic pistons 323 is now released, and the bars rapidly removed to the starting point, whereafter the tacking cycle is recommenced. The length of the bars and that of the stroke are so dimensioned that consecutive strokes overlap somewhat, thus keeping unbroken the lines of the tacking.

The backward and forward movements of the bars described above are, according to the present embodiment of the invention, made to synchronize with the corresponding movements of the mobile press, and for this reason the bars are connected to the in-feed end of the mobile press, and follow it in its oscillating movements. The way in which these movements are effected will be outlined later in conjunction with the description of the "pressing" section.

It is apparent that the movements of the bars can also be effected without the aid of the mobile press by means of a separate machine corresponding to the driving device for the mobile press. It is furthermore apparent that the plywood assembly, after having been "tacked," can be cut into panels and these transferred into a stationary press for the final setting of the adhesive of the panels. This last mentioned way of manufacture is, of course, far less advantageous than the fully continuous process made possible by the use of the mobile press, but may be considered for instance if there is a plywood press of ordinary stationary type already available, and which if it is desired should be used.

In this connection, it should be pointed out that it is possible within the scope of this invention to modify the device for the tacking operation by substituting for the device described a device as explained in the inventor's copending application No. 789,308, in which, instead of the pressing bars moving back and forth, endless rotated pressing belts are used to effect the continuous tacking of the assembly.

*The "Pressing" Section*

After the plywood assembly has been preliminarily bonded by the foregoing tacking operation, it is conveyed into a mobile press illustrated in FIGS. 17, 18, 19 and 20. The press is characterized by a lower press plate 401 and an upper plate 402 mounted in a frame construction 403. The lower plate is fixed to the frame construction, whereas the upper plate is movable vertically by the aid of hydraulic jacks 404. The press is further provided with wheels 405 running on rails 406, and is movable to and fro in the direction of the travelling plywood mat. The press operates so that at the rear turning point, located at the right end of the track, according to the figures, it is accelerated to the speed of the travelling plywood mat and once it has reached it, hydraulic jacks 404 of the press are actuated in order to tighten the press plates against the plywood, thereby starting the setting of the glue. The press is then moved synchronously with the travelling plywood for a distance which corresponds to the setting time of the adhesive, and following this, the press having reached its other turning point at the other end of the track, the pressure of the jacks is released and the press plates separated. This done, the press is rapidly removed to the first mentioned turning point, and the operation cycle repeated. The length of the press and its travelling stroke are so dimensioned that each pressing stroke somewhat overlaps the area pressed in the preceding stroke, resulting in the plywood mat being continuously pressed over the whole of its length.

In order to speed up the setting of the glue, the press plates are heated, and are to this end furnished with channels through which is passed a heating agent. The agent is transmitted to the press plates from a stationary source, not shown in the figures, by toggle jointed pipes 407, 408, 409 and 410 which are capable of following the press in its motion to and fro. The stationary ends 411 and 412 of the pipe system are mounted on a double mast construction 425 and 426, bridging the press track. At mast 425, the heating agent is let into the system through pipe 411, and, after having circulated along the pipes and the channels in the press plates, is let out from the stationary outlet pipe 412 at mast 426. The circulating agent can be heated by a heat exchanger, and passed through the system with the aid of a pump or by similar means.

It is advisable to have the plate ends cooled at the feed of the press. This prevents premature setting of the adhesive of the plywood immediately outside the press plates due to their heat radiation. By introducing a cooling agent into the channels nearest the plate ends, this inconvenience is avoided. The cooling agent can easily be transmitted to the press by fixing a flexible tube to the articulated heating piping. The electrical cables can be led to the press in the same way.

A further essential feature of the invention is the way in which the oscillating movement of the press is executed. Here it is of particular importance that the press, despite its rather considerable mass during its forward, i.e. pressing, stroke, is moved so as to synchronize absolutely with the travelling plywood, as otherwise damage may be caused to the unpressed part of the assembly. In the invention, the synchronization is achieved by effecting the pressing stroke by a force which continuously endeavours to give the press a motion which is higher in speed than that of the travelling plywood, independently of its rate. However, the effect of this force is barred by a rotating stop, revolving in pace with the machinery forwarding the plywood, whereby the pressing stroke movement of the press is forced to synchronize with the travel of the plywood. It is apparent that the force used for this purpose must be of "yielding" nature. Suitable sources of power of this kind include pneumatic devices, a hydraulic motor combined with an overflow valve, or simply a suspended weight. The last mentioned source is that made use of in the description of the present embodiment of the invention.

In accordance with the principle presented above, the motion cycle of the press proceeds as follows: starting from the return movement, it is effected by an electric motor 413, which by means of a transmission gear 414 and a chain drive 415 acts upon shaft 416, which in its turn, by means of pinions 417 and 418 and racks 419 and 420 affects the press and causes the return stroke, i.e. in a left to right direction according to the figures. Simultaneously, drums 421 and 422 wind up wires 423 and 424 respectively, the other ends of which are fixed to masts 425 and 426 respectively. The wires run over pulleys 427 and 428 mounted on masts 425 and 426, and over pulleys 429 and 430, hoisting the weights 431 and 432. The total masses of these weights are dimensioned so as to enable them to accelerate the press. At a distance before the end of the return stroke, with the distance equal to the retardation stretch of the press, determined by its mass, its travelling friction and the counteracting weights, the motor is switched off and the press allowed to proceed by its vis viva to the dead point. However, owing to the hoisted weights the press, after the dead point, automatically begins moving in the opposite direction, i.e. that of the pressing stroke. Through the effect of the weights, the press accelerates, and at the point where the acceleration reaches the speed of the travelling plywood, its motion is barred by a revolving stop clutch which permits the press to move at the speed of the travelling plywood only, thereby enabling the press plates to be closed on the plywood. For the sake of simplicity the stop clutch barring the acceleration of the press is shown in the figures in the form of a ratchet with a coacting pawl. As is illustrated in FIGS. 19 and 20, ratchet 433 is fixed on shaft 416, allowing the shaft to revolve freely with respect to the co-operating pawl in a direction corresponding to that of the return stroke of the press. The pawl indicated by reference 434 is mounted on a sprocket wheel 435, which by means of a chain drive 436 and transmission gear 437 is connected to main shaft 7. The travel of the plywood mat and the rotation of the pawl are thus operated by the same source of power, i.e. by main shaft 7, by reason of which the two movements can also be made to coincide. Accordingly, during the pressing stroke the press has to travel at a rate which is synchronous with that of the plywood from the moment the ratchet engages the pawl, as the travel of the press, as well as that of the plywood is subsequently governed by the revolving speed of the main shaft only.

The control of motor 413 returning the press, and of hydraulic jacks 404 closing and opening the press plates, is according to the embodiment carried out by electrical impulses transmitted from limit switches, not shown in the figures, placed on the press and along its track. This control involves no special problem except for the giving of the impulse energizing the closing of the press at the beginning of the pressing stroke. This closing must not occur until the press has reached the travelling speed of the plywood, which means that prior to this the press must have travelled the acceleration distance from the dead point. As the braking forces acting upon the press during the retardation of its return stroke may differ somewhat from one stroke to another, the location of the dead point may also vary somewhat. In order to ensure that the necessary acceleration distance has been travelled before the press plates are closed, a special control arrangement is required. FIG. 16 shows schematically how this detail of the control system is arranged. Reference 438 indicates a rail fixed stationary along the track of the press. On the rail, a sliding cam 439 is mounted, so designed that it requires more force to make it slide than the operation of the co-acting limit switch demands. The cam, however, can be slid by the mobile press 403 with the aid of two pushers 440 and 441 fixed to it. The control device operates as follows: FIG. 8 shows the situation at the dead point after the return stroke of the press, when pusher 440 has removed cam 439 into position $A_1$. At the beginning of the pressing stroke, the direction of which is indicated by arrow C, limit switch 442 on press 403 travels distance D corresponding to the acceleration stretch of the press before the limit switch is actuated by cam 439 and the impulse given off for the closing of the press plates. At a distance before the turning point at the end of the pressing stroke, this distance being greater than the spread of the dead points of the return strokes, cam 439 is slid by pusher 441 into position B, so as to enable the cam at the next return stroke of the press to be slid by pusher 440 to a new position $A_2$ representing the turning point of this particular stroke, whereafter the cycle described will be repeated. When limit switch 442 passes cam 439 at the return stroke, no impulse is given off by the limit switch, it being adjusted to act in one direction only.

As mentioned above, the movements of the mobile press can also be employed for the moving of the pressing bars utilized for the tacking of the plywood mat. This is taken advantage of in the present embodiment, where pressing bars 315 and 316 are attached to the feed-end of the mobile press. By this arrangement the heating agent for the tacking bars can also be supplied by the mobile press, whose transmission can be provided, for instance, by means of flexible tube connections, not shown in the figures. At the other end of the press, i.e. at the exit end, there is a series of supporting rolls 443 arranged so as to carry the part of the plywood mat emerging from the press at its return stroke. Supporter rolls 443 are arranged to run on rails 444 on either side of the press track. The rolls are connected to each other, as well as to the press and the ends of the rails, by means of chains 445 in a way which allows them during the backward and forward movements of the press to be rolled from and to each other.

In order to prevent the plywood from causing damage to the still unbonded assembly mat by moving backwards, which could happen if the just-pressed plywood were not properly disengaged from the press plates before the start of the return stroke, the press track is furnished with a locking device which hinders the plywood from being moved in the direction opposite to that of production. According to the embodiment this locking device comprises a counter support 446 and therewith co-operating pivoted stop fingers 447, which, on any backward movement of the plywood, instantly engage it and stop the movement, thereby also detaching the plywood from the returning press plates.

The "Trimming" Section

The plywood mat 201-1-251 continuously emerging from the "pressing" section is conveyed into the "trimming" section, illustrated in FIGS. 21, 22, 23 and 24. To start with, the plywood mat is trimmed to size by an edge cutting device. This comprises guiding rolls 501 for the vertical guidance of the plywood, and cutter heads 502 run by motors 503 by which the edges are trimmed either plain or to the desired shape, as for instance tongue and groove. The clean cut plywood is then led between two vertical steering rolls 504. The steering rolls are adjustable transversely, enabling the plywood mat to be guided to travel exactly with respect to the cutter heads. Finally the moving plywood mat is cut into panels of the desired lengths. This is done by a mobile cutting saw 505 mounted on wheels 506 running on rails 507. When end 508 of the plywood mat has reached limit switch 509, an electrical impulse is transmitted, causing clampers 510, actuated by pneumatic cylinder 511, to grip the travelling plywood, whereby saw device 505 starts to travel with the plywood. The electrical impulse from limit switch 509 also starts motor 513 which, by means of screw spindle 514, feeds circular saw 512 transversely over the plywood mat, thus cutting off a panel of the length determined by the location of the limit switch. This done, the saw device is returned by means of pneumatic cylinder 515. At the next cut, the transversely moving circular saw 512 is fed in the opposite direction. The detached panel is carried away along rollers 516.

It is to be understood that the term "plywood" as used in this connection is intended to include not only laminated structures such as all-veneer plywood, lumber core plywood and different kinds of derivatives from these constructions, the plies of which are composed of natural wood, but also structures, of which part, and in some cases all, of the plies are composed of artificial sheet material used as substitutes for natural wood plies, and that it does not exclude structures wherein there are also included one or more plies of other material, such as for instance paper, plastics, metals etc.

It is further to be understood that while a preferred method and apparatus are exemplified herein, the invention nevertheless embraces a variety of procedures and apparatus and that the steps and mechanisms exemplified may be widely modified.

Moreover, steps or mechanisms exemplified in connection with the description of preferred forms of procedure or apparatus may in many instances be omitted without departing from the invention in its broader aspects.

What I claim is:

1. A continuous process for the making of plywood, which comprises: assembling the components which constitute the plywood to form the requisite number of separate continuous layers; continuously moving said continuous layers so as to converge into juxtaposition and form a multi-ply assembly; during their movement creating and maintaining tight contact between the individual components of the layers; applying thermo-setting adhesive between the continuous layers prior to their convergence; keeping the moving multi-ply assembly in a grip which prevents the individual components of the assembly from being displaced from their predetermined position within the assembly; submitting the continuously moving assembly while it is in said grip, to a "tacking" operation by bringing the adhesive of the assembly to set on limited areas of the assembly to an extent which permits removal of the assembly from said grip without displacement of its components from their predetermined position; subjecting the continuously moving "tacked" assembly to a pressing operation carried out step-wise whereby the adhesive of the assembly is set over its entire area; having the resulting continuous plywood mat edge-trimmed and cut into panels of the lengths desired.

2. A continuous process for the making of plywood, which comprises: assembling the components which constitute the plywood to form the requisite number of separate continuous layers; continuously moving said continuous layers so as to converge into juxtaposition and form a multi-ply assembly; during their movement creating and maintaining tight contact between the individual components of the layers; applying thermo-setting adhesive between the continuous layers prior to their convergence; keeping the moving multi-ply assembly in a grip which prevents displacement of the individual components of the assembly from their predetermined position within the assembly; submitting the continuously moving assembly while it is in said grip to a "tacking" operation by bringing the adhesive of the assembly to set on limited areas of the assembly to an extent which permits removal of the assembly from said grip, without displacement of its components from their predetermined position; having the continuous "tacked" assembly cut into panels; transferring said panels into a stationary press for the setting of the adhesive of the panels.

3. A continuous process for the making of three-ply all veneer plywood which comprises: assembling a continuous core-layer of veneer strips which are disposed longitudinally and contiguously with their bevelled and adhesive coated ends placed so as to overlap each other in order to provide a scarf-jointed core-layer of equal thickness and strength over all its length in the ready-made plywood; separately assembling a continuous top layer of veneer strips which are disposed transversely; separately assembling a continuous bottom layer of veneer strips which are disposed transversely; continuously moving the layers so that the top and bottom layers converge into juxtaposition with the core layer and form a three-ply assembly; during said movement creating and maintaining tight contact between the veneer strips of the top and bottom layers and between the ends and the sides of the strips of the core layer; applying thermo-setting adhesive on either side of the core layer prior to the convergence of the top and bottom layer on the core layer; keeping the resulting three-ply assembly in a grip which prevents displacement of the individual strips of the assembly from their predetermined position within the assembly; submitting the assembly while it is in said grip to a "tacking" operation by bringing the adhesive of the assembly to set on limited areas of the assembly to an extent which permits removal of the assembly from said grip without displacement of the strips from their predetermined position; subjecting the "tacked" three-ply assembly to a pressing operation carried out step-wise by a mobile one-opening press whereby the adhesive of the assembly is set over its entire area; having the resulting continuous plywood mat edge-trimmed and cut into panels of the lengths desired.

4. A continuous process for the making of three-ply lumber core plywood which comprises: assembling a continuous core layer of lumber strips which are disposed contiguously and longitudinally and with the ends of the strips abutting; separately assembling a continuous top layer of veneer strips which are disposed transversely; separately assembling a continuous bottom layer of veneer strips which are disposed transversely; continuously moving the layers so that the top and bottom layers converge into juxtaposition with the core layer and form a three-ply assembly; during said movement creating and maintaining tight contact between the veneer strips of the top and bottom layers and between the ends and the sides of the strips of the core layer; applying thermo-setting adhesive on either side of the core layer prior to the convergence of the top and bottom layer on the core layer; keeping the resulting three-ply assembly in a grip which prevents displacement of the individual strips of the assembly from their predetermined position within the assembly; submitting the assembly while it is in said grip to a "tacking" operation by bringing the adhesive of the assembly to set on limited areas of the assembly to an extent which permits removal of the assembly from said grip without displacement of the strips from their predetermined position; subjecting the "tacked" three-ply assembly to a pressing operation carried out step-wise by a mobile one-opening press whereby the adhesive of the assembly is set over its entire area; having the resulting continuous plywood mat edge-trimmed and cut into panels of the lengths desired.

5. In an apparatus for the continuous making of plywood, that combination which comprises: means for assembling the components which constitute the plywood to form the requisite number of separate continuous layers; means for continuously moving said continuous layers so as to converge into juxtaposition and form a multi-ply assembly; means for during said movement creating and maintaining tight contact between the individual components of the layers; means for applying thermo-setting adhesive between the continuous layers prior to their convergence; means for keeping the moving multi-ply assembly in a grip which prevents displacement of the individual components of the assembly from their predetermined position within the assembly; means for submitting the continuously moving assembly while in said grip to a "tacking" operation by bringing the adhesive of the assembly to set on limited areas of the assembly to an extent which permits removal of the assembly from said grip without displacement of its components from their predetermined position; a mobile one-opening press for step-wise setting of the adhesive of the assembly over its entire area; means for having the resulting continuous plywood mat edge-trimmed and cut into panels of the lengths desired.

6. In an apparatus for the continuous making of plywood, that combination which comprises: means for assembling the components which constitute the plywood to form the requisite number of separate continuous layers; means for continuously moving said continuous layers so as to converge into juxtaposition and form a multi-ply assembly; means for during said movement creating and maintaining tight contact between the individual components of the layers; means for applying thermo-setting adhesive between the continuous layers prior to their convergence; means for keeping the moving multi-ply assembly in a grip which prevents displacement of the individual components of the assembly from their predetermined position within the assembly; means for submitting the continuously moving assembly while in said grip to a "tacking" operation by bringing the adhesive of the assembly to set on limited areas of the assembly to an extent which permits removal of the assembly from said grip without displacement of its components from their predetermined position; means for cutting the continuous "tacked" assembly mat into panels; means for having said panels transferred into a stationary press for the setting of the adhesive of the panels.

7. In an apparatus for the continuous making of three-ply all veneer plywood, that combination which comprises: means for assembling a continuous core-layer of veneer strips disposed longitudinally and contiguously with their bevelled and adhesive coated ends placed so as to overlap each other in order to provide a scarf-jointed core-layer of equal thickness and strength over all its length in the ready-made plywood; means for separately assembling a continuous top layer of veneer strips disposed transversely; means for separately assembling a continuous bottom layer of veneer strips disposed transversely; menas for continuously moving said layers so that the top and bottom layers converge into juxtaposition with the core layer and form a three-ply assembly; means for during said movement creating and maintaining tight contact between the veneer strips in the top and bottom layers and between the ends and the sides of the strips of the core layer; means for applying thermo-setting adhesive on either side of the core layer prior to the convergence of the top and bottom layer on the core layer; means for keeping the resulting three-ply assembly in a grip which prevents displacement of the individual strips of the assembly from their predetermined position within the assembly; means for submitting the assembly while it is in said grip to a "tacking" operation by bringing the adhesive of the assembly to set on limited areas of the assembly to an extent which permits removal of the assembly from said grip without displacement of its components from their predetermined position within the assembly; a mobile one-opening press, wherein the continuously moving "tacked" assembly is subjected to a pressing operation carried out step-wise whereby the adhesive of the assembly is set over its entire area; means for having the resulting continuous plywood mat edge-trimmed and cut into panels of the lengths desired.

8. In an apparatus for the continuous making of three-ply lumber core plywood, that combination which comprises: means for assembling a continuous core layer of lumber strips which are disposed continuously and longitudinally and with the ends of the strips abutting; means for separately assembling a continuous top layer of veneer strips disposed transversely; means for separately assembling a continuous bottom layer of veneer strips disposed transversely; means for continuously moving said layers so that the top and bottom layers converge into juxtaposition with the core layer and form a three-ply assembly; means for during said movement creating and maintaining tight contact between the veneer strips in the top and bottom layers and between the ends and the sides of the strips of the core layer; means for applying thermosetting adhesive on either side of the core layer prior to the convergence of the top and bottom layer with the core layer; means for keeping the resulting three-ply assembly in a grip which prevents displacement of the individual strips of the assembly from their predetermined position within the assembly; means for submitting the assembly while it is in said grip to a "tacking" operation by bringing the adhesive of the assembly to set on limited areas of the assembly to an extent which permits removal of the assembly from said grip without displacement of its components from their predetermined position within the assembly; a mobile one-opening press, wherein the continuously moving "tacked" assembly is subjected to a pressing operation carried out step-wise whereby the adhesive of the assembly is set over its entire area; means for having the resulting continuous plywood mat edge-trimmed and cut into panels of the lengths desired.

References Cited in the file of this patent
UNITED STATES PATENTS

| | | |
|---|---|---|
| 1,870,041 | Dike | Aug. 2, 1932 |
| 2,084,980 | Sweeney | June 22, 1937 |
| 2,457,498 | Russell et al. | Dec. 28, 1948 |
| 2,478,857 | Brown et al. | Aug. 9, 1949 |
| 2,488,759 | Bolling | Nov. 22, 1949 |
| 2,490,819 | Lambert et al. | Dec. 13, 1949 |
| 2,572,772 | Skoog | Oct. 23, 1951 |
| 2,691,995 | Carlson | Oct. 19, 1954 |
| 3,021,248 | Mann et al. | Feb. 13, 1962 |